US007467615B2

(12) United States Patent
Siewert (10) Patent No.: US 7,467,615 B2
(45) Date of Patent: Dec. 23, 2008

(54) METHOD AND APPARATUS TO CONTROL FUEL INJECTION

(75) Inventor: Robert M. Siewert, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/535,509

(22) Filed: Sep. 27, 2006

(65) Prior Publication Data

US 2008/0072872 A1  Mar. 27, 2008

(51) Int. Cl.
*F02B 3/00* (2006.01)
*F02M 1/00* (2006.01)

(52) U.S. Cl. .................... 123/299; 123/300; 123/446

(58) Field of Classification Search ............... 123/27 R, 123/294, 299, 300, 446
See application file for complete search history.

(56) References Cited

U.S. PATENT DOCUMENTS

| 3,792,692 | A | 2/1974 | Klley | |
| 5,265,562 | A | 11/1993 | Kruse | |
| 6,382,177 | B1 * | 5/2002 | Saito | 123/299 |
| 6,691,671 | B2 | 2/2004 | Duffy et al. | |
| 2003/0145581 | A1 | 8/2003 | Tashiro | |
| 2005/0268883 | A1 | 12/2005 | Sobotowski et al. | |
| 2006/0086081 | A1 * | 4/2006 | Andersson et al. | 123/308 |

FOREIGN PATENT DOCUMENTS

| EP | 1281852 A2 | 2/2003 |
| EP | 1541844 A1 | 6/2005 |
| EP | 1798404 A1 | 6/2007 |

OTHER PUBLICATIONS

Tow, T.C., et al., Reducing Particulate and NOx Emissions by using Multiple Injections in a Heavy Duty DI Diesel Engine, SAE Tech Paper, 1994, #940897, SAE, Warrendale, PA, US.
Nakada, T., et al., Emission Control for the Duramax 6600 V8 Diesel Engine, SAE Tech Paper, 2000, #2000-01-3513, SAE, Warrendale, PA, US.
Ohishi, K., et al., The New Common Rail Fuel System for the Duramax 6600 V8 Diesel Engine, SAE Tech Paper, 2001,#2001-01-2704, SAE, Warrendale, PA, US.
Kerekes, J., et al., The Design Concept of the Duramax 6600 Diesel Engine, SAE Tech Paper, 2001, #2001-01-2703, SAE, Warrendale, PA, US.

* cited by examiner

*Primary Examiner*—John T Kwon (57) ABSTRACT

A method for controlling direct fuel injection into an engine is detailed. The method comprises determining a quantity of fuel to inject into a combustion chamber during a combustion cycle, and, executing three fuel injection events during the combustion cycle. The first fuel injection event is initiated during a compression stroke immediately before top-dead-center point of piston travel. A first dwell time is substantially equal to a second dwell time. Quantities of fuel injected during each of the three fuel injection events are substantially equal. An aspect of the invention includes the first and second dwell times determined based upon emissions and engine thermal efficiency. The invention facilitates improved engine-out emissions, without substantial changes in engine or after-treatment hardware.

13 Claims, 8 Drawing Sheets

METHOD AND APPARATUS TO CONTROL FUEL INJECTION

TECHNICAL FIELD

This invention pertains generally to internal combustion engines, and more specifically to fuel injection and combustion in a direct-injection engine.

BACKGROUND OF THE INVENTION

Manufacturers of compression-ignition engines face increasingly stringent emissions standards in the future, including reductions in allowable levels of nitrides of oxygen ('$NO_x$') and particulate matter ('PM'). Broadly speaking, reducing emissions is achieved by reducing engine-out emissions, or by converting engine-out emissions to harmless gases using some form of exhaust gas aftertreatment, including converters, traps, or afterburners. Systems and methods to reduce engine-out emissions can include systems which pre-mix fuel and air before entrance to the combustion chamber.

Achieving low emissions levels is especially challenging at high-load engine operating conditions. Known fuel/air pre-mixing concepts are able to achieve low $NO_x$ and PM emissions at low engine load levels. However, such systems are often not operable during higher engine load operation due to excessive combustion noise, among other problems.

Therefore, there is a need for improved operation of a compression-ignition engine to address the aforementioned concerns.

SUMMARY OF THE INVENTION

In accordance with an embodiment of the invention, there is provided a method for controlling fuel injection into a direct injection, compression-ignition engine. The method comprises determining a quantity of fuel to inject into a combustion chamber during a combustion cycle, and, executing three fuel injection events during the combustion cycle. The first fuel injection event is initiated during a compression stroke immediately before top-dead-center point of piston travel. A first dwell time is substantially equal to a second dwell time. Quantities of fuel injected during each of the three fuel injection events are substantially equal. An aspect of the invention includes the first and second dwell times determined based upon emissions and engine thermal efficiency. The invention facilitates improved engine-out emissions, without substantial changes in engine or aftertreatment hardware.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described and illustrated in the accompanying drawings which form a part hereof, and wherein.

DETAILED DESCRIPTION OF EMBODIMENTS OF THE INVENTION

Figure 1:
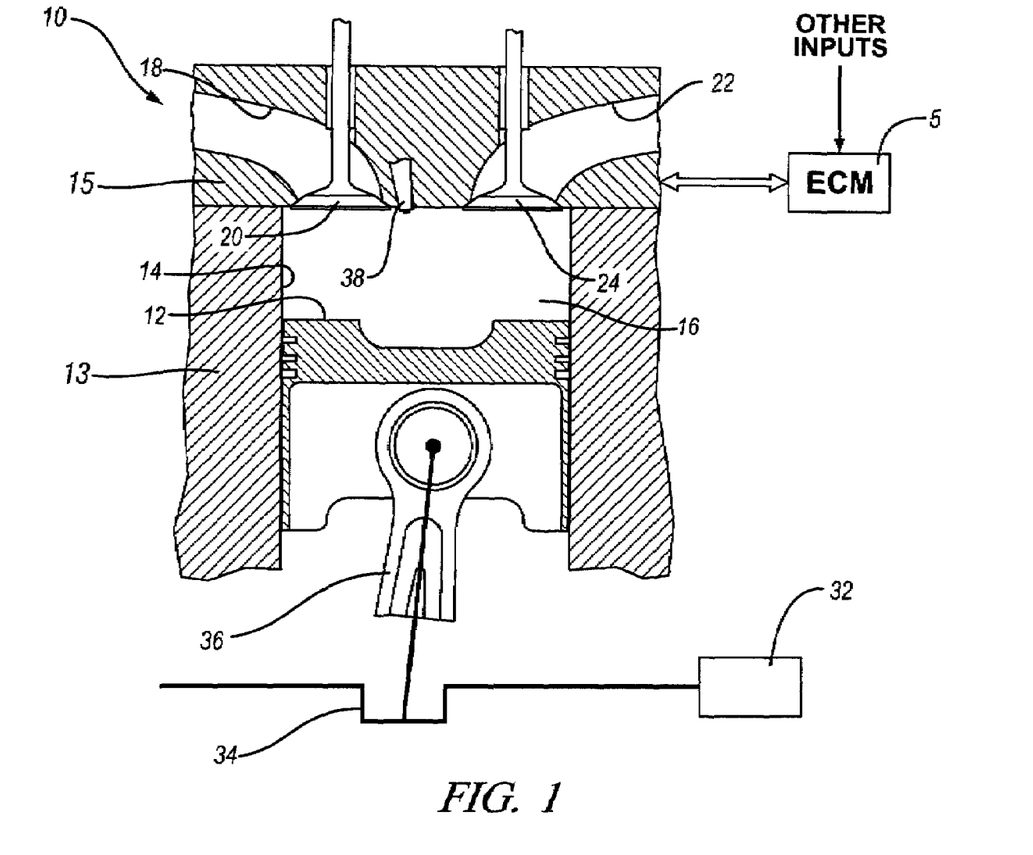
FIG. 1 is a schematic diagram, in accordance with the present invention.

Referring now to the drawings, wherein the showings are for the purpose of illustrating the invention only and not for the purpose of limiting the same, FIG. 1 depicts an internal combustion engine 10 which has been constructed in accordance with an embodiment of the invention. The invention comprises a method and system to manage and control aspects of engine operation and combustion, and therefore control exhaust emissions. The exemplary engine comprises a direct injection, diffusion combustion compression-ignition engine employing a four-stroke operation wherein each engine combustion cycle comprises 720 degrees of angular rotation of a crankshaft divided into four 180-degree stages of intake-compression-expansion-exhaust, which are descriptive of piston movement in each engine cylinder. Diffusion combustion is characterized by combustion of fuel immediately upon injection into a combustion chamber with little or no pre-mixing of the fuel with air in the combustion chamber. The internal combustion engine 10 is operatively coupled with an engine control module (ECM) 5 adapted to execute engine control schemes, based upon operator inputs, ambient conditions, and engine operating conditions.

Referring to FIG. 1, the exemplary internal combustion engine comprises a multi-cylinder engine, comprising an engine block 13, a head 15, and a crankshaft 34. A plurality of cylinders 14 is formed in the block, each cylinder 14 containing a piston 12 operative to move linearly therewithin. Each piston 12 is mechanically operably connected to the crankshaft 34 via a piston rod 36, and the crankshaft is mounted to the engine block 13 on main bearings. A combustion chamber 16 is formed in each cylinder 14 between the top of each piston 12 and the cylinder head 15. The crankshaft 34 rotates at the main bearings, in response to linear force applied thereto by the piston rods 36, as a result of combustion events in the combustion chambers 16. The head 15 contains one or more air inlet ports 18 and intake valves 20, one or more exhaust ports 22 and exhaust valves 24, and a fuel injector 38 operable to deliver fuel directly into the combustion chamber 16. Opening and closing of the intake valves 20 is controlled by a camshaft, the action of which controls inflow of air to the combustion chamber. Opening and closing of the exhaust valves 24 is controlled by a camshaft, the action of which controls exhaust of combustion products out of the combustion chamber. There is a crank sensor 32 located substantially near the crankshaft, operative to generate a signal correlatable to angular position of the crankshaft which is readable by the ECM 5. The crank signal is translated by the ECM to determine crankshaft speed and crankshaft rotational position, and hence position of each of the pistons.

The fuel injector 38 is preferably an element of a common-rail fuel injection system further comprising a high-pressure fuel pump operative to deliver high-pressure (e.g., 1,800 bar/180 MPa) fuel to each injector. The fuel injector comprises one of a solenoid-actuated or piezoelectric-actuated device with a nozzle placed through an opening in the head to inject pressurized fuel into the combustion chamber. The injector nozzle comprises a fuel injector tip characterized by number of openings, spray angle, and flow number, representing a volumetric flow rate at a given pressure. An exemplary fuel injector tip, described hereinafter, comprises a 7-hole, 158-deg spray angle having a 405 flow number (in cc/30-s @ 100 bar). Fuel injector characteristics further comprise minimum and maximum flowrates and dynamic range. The ECM 5 is operative to individually and selectively control the fuel injectors to deliver precise quantities of fuel at specific times during ongoing engine operation.

The ECM 5 preferably comprises a central processing unit signally electrically connected to volatile and non-volatile memory devices via data buses. The ECM is signally connected to sensing devices and operatively connected to output devices to monitor and control engine operation and operator inputs. The output devices preferably include subsystems necessary for proper control and operation of the engine, comprising the fuel injection system, and other devices including an exhaust gas recirculation (EGR) system (not shown). The engine sensing devices include devices operable to monitor engine operation, external conditions, and operator demand, e.g., operator torque requests. Control algorithms are typically executed during preset loop cycles such that each is executed at least once per loop cycle. Loop cycles are executed each 3, 6, 15, 25 and 100 milliseconds for typical engine operation. The description of the ECM 5 and the internal combustion engine is meant to be illustrative, and not restrictive to the invention.

The invention comprises a method for controlling injection of fuel into the combustion chamber is detailed. The method comprises determining a quantity of fuel to inject during each combustion cycle, based upon engine operating conditions and operator demand for torque. During a high load engine operation, e.g., engine operation in a range of eight to sixteen bar BMEP or greater, fuel is injected into each combustion chamber 16 by executing a triple injection, wherein three successive fuel injection events occur during each combustion cycle. There is a minimum engine operating point for permitting triple injection, below which it is not feasible to execute triple injection. This minimum engine operating point is driven by dynamic range of the fuel injectors and the ability of the system to precisely control fuel injection and engine operation. Dwell times between the successive fuel injection events are substantially equal, and, quantities of fuel injected during each of the fuel injection events are substantially equal. Dwell time is defined to be an elapsed time between an end of an injection event and initiation of a subsequent fuel injection event, during a combustion cycle.

Figure 2:
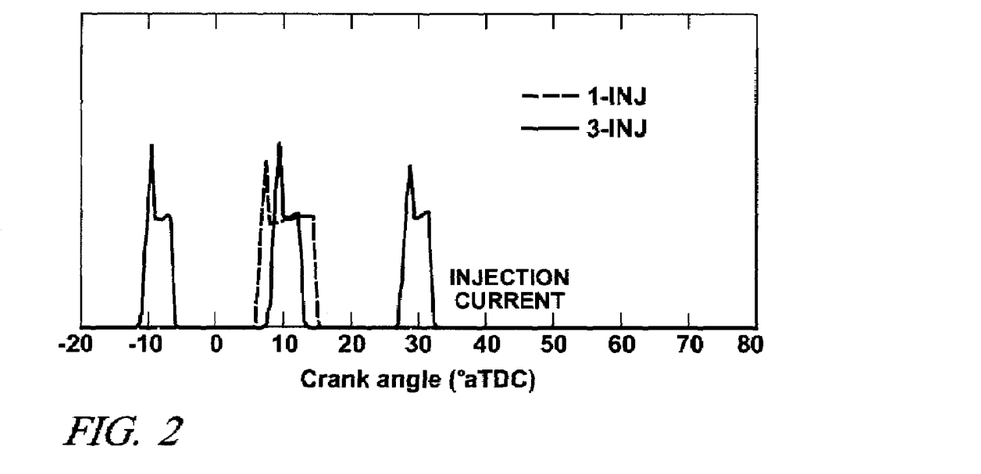
FIGS. 2 and 3 are graphical depictions related to engine operation, in accordance with the present invention; and, FIGS. 4-15 are graphical diagrams of quantitative parametric data, in accordance with the present invention.

Referring to FIG. 2, a graphical depiction of exemplary timing of three injection events of the triple injection (3-INJ) is provided, and compared to a single injection event (1-INJ) for delivering the same quantity of fuel. In this depiction, the exemplary engine is operating at an operating point comprising 2115 revolutions per minute (RPM), at a manifold pressure of 215 kPa, absolute, and brake mean-effective-pressure (BMEP) of 8 bar, and the data depicted is an undimensioned signal representing electrical current flow to fuel injector 38 as a function of engine crank angle degrees around top-dead-center (CA° aTDC). The single injection (1-INJ) comprises a conventional injection event, wherein the entire quantity of fuel scheduled for delivery to the combustion chamber during the engine cycle is injected. In the diffusion combustion engine, the exemplary single injection event preferably occurs immediately after top-dead-center (TDC) during the expansion stroke, shown herein starting at about six crank-angle degrees after top-dead-center (6 CA° aTDC) for the specific cylinder. The magnitude of the fuel injection pulsewidth is determined by algorithms resident in the ECM 5 to deliver the requisite quantity of fuel to the combustion chamber based upon a predetermined calibration. The triple injection (3-INJ) comprises three successive fuel injection events, wherein a third of the quantity of fuel scheduled for delivery to the combustion chamber during the engine cycle is injected during each injection event, and a predetermined dwell time between the injection events. The magnitude of each of the first, second, and third fuel injection pulsewidths is determined by algorithms resident in the ECM to deliver the requisite quantity of fuel to the combustion chamber based upon a predetermined calibration. Initiation of the first fuel injection event typically occurs near top-dead-center during the compression stroke, shown herein with the first injection event beginning at about twelve crank-angle degrees before top-dead-center (12 CA° bTDC) for the specific cylinder. There is a dwell-time after the end of the first injection, and then the second injection is initiated, beginning at about 8 CA° aTDC. There is a second dwell-time after the end of the second injection, and then the third injection is initiated, beginning at about 27 CA° aTDC. The dwell time is set at about 1000 microseconds in this example.

Figure 15:
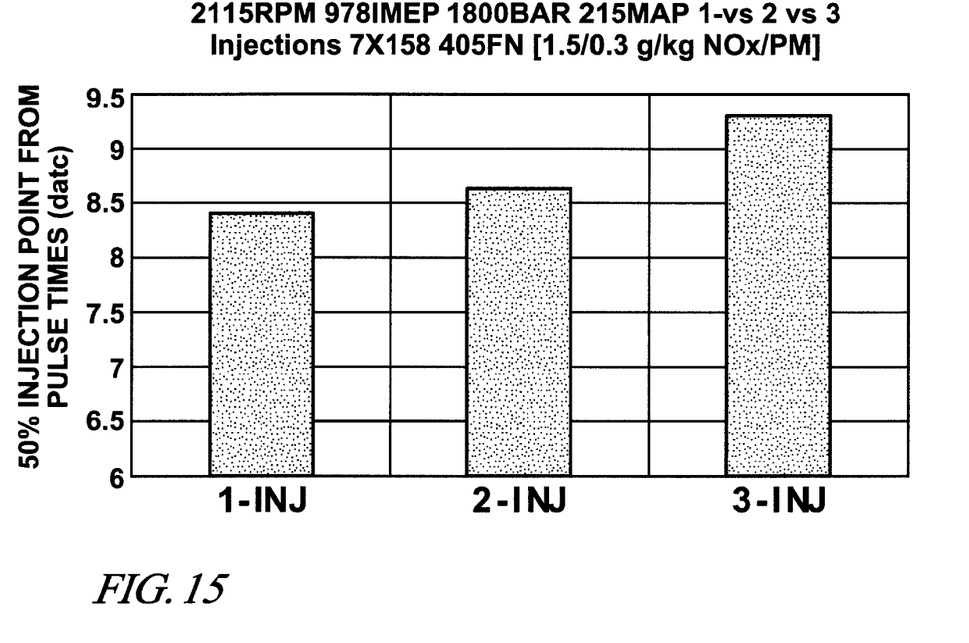

Initiation of the first fuel injection event of the triple injection is preferably determined based upon a crank angle at which 50% of the quantity of fuel injected during the combustion cycle for the three injection event is substantially the same as for the single injection event for injecting the quantity of fuel. Representative data depicting preferred crank angles at which 50% of the fuel has been injected for a specific engine operating point is provided in FIG. 15. Preferred crank angle at which 50% of the fuel has been injected is readily determinable for a single injection event, based upon analytical and empirical data related to operation of a specific engine configuration. The crank angle at which to initiate the first fuel injection event for the triple injection can be readily determined by an algorithm resident in the ECM based upon the triple injection event injector pulsewidths for the combustion cycle and the dwell time, with adjustments for lag times related to fuel heat release and other effects. Preferred crank angles at which 50% of the fuel has been injected for a specific engine operating point is provided in FIG. 15, showing the 50% injection point for the triple injection event to lag the 50% injection point for the single injection by about 0.9 crank-angle degrees (CA°).

Referring to FIGS. 3 through 14, datagraphs are shown depicting various aspects of engine operation for the triple injection as compared to single and dual injection events similarly executed. The datagraphs comprise representative results obtained from testing conducted on an exemplary direct-injection diesel combustion engine described with reference to FIG. 1, operating under the conditions described hereinbelow. The exemplary engine has further dimensions and operating conditions described with reference to Table 1.

TABLE 1

| Bore | 103 mm |
|---|---|
| Stroke | 99 mm |
| Engine Speed | 2115 RPM |
| BMEP | 8 bar |
| Manifold Pressure | 215 kPa absolute |
| Fuel Rail Pressure | 1800 bar |
| Injector Tip (# of holes) | 7 quantity |
| Injector Tip Flow Number | 405 cc/30 s @ 100 bar |
| $NO_x$ Emission Index | 1.5 g/kg fuel |

Figure 3:
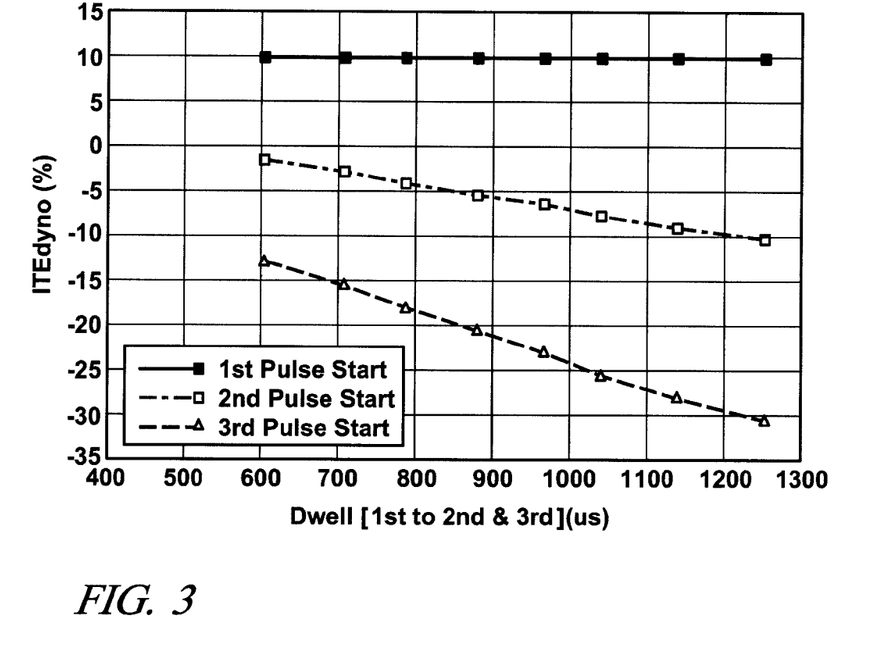

Referring now to FIG. 3, timing of each of the first, second, and third fuel injection events for the triple injection are graphically depicted, with varying dwell times, for the exemplary engine operating under conditions described with reference to Table 1. Timing of the first injection event is held constant at 10 CA° bTDC, and injection times of the second and third injection events are shown, in crank angle degrees, based upon varying dwell times from 600 to 1250 microseconds, when the engine is operating at 2115 RPM. The operating condition described in Table 1 comprises a high load condition of about 8-bar BMEP and 2115 RPM engine speed. Engine parameters include a high fuel rail pressure of 1800 bar and the fuel injector tip comprising a 7-hole, 158-deg spray angle having a 405 flow number (in cc/30-s @ 100 bar). $NO_x$ emission index is held constant at 1.5-g/kg fuel by adjusting EGR flow rate. These comparisons were made with a constant particulate mass (PM) of 0.3 g/kg as effected by the single injection timing specified and the timings and dwells selected for the multiple injection cases.

Figure 4:
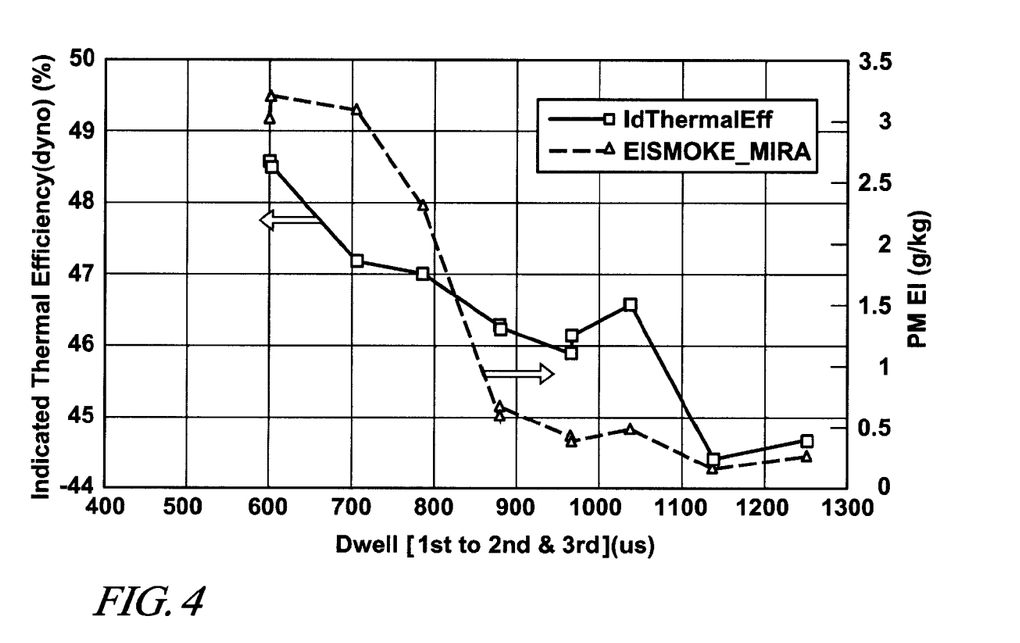

Referring now to FIG. 4, data is shown comprising results for operating the exemplary engine as described with reference to Table 1 over the range of dwell times, wherein particulate mass emission index (PM EI) and indicated thermal efficiency (ITE) are monitored. The PM EI is measured in units of grams of PM per kilogram of fuel (g/kg), calculated from a measured filter smoke number (FSN). The indicated thermal efficiency (ITE) is measured in percent, and is based on measured fuel flow and firing and motoring torques. Both PM and ITE are demonstrated to vary with the dwell time, with PM and ITE both decreasing with increasing dwell time. There is a preferred range of dwell magnitude from about 950 to 1100 microseconds for this embodiment to reach reasonable low PM values without unduly lowering thermal efficiency.

Figure 5:
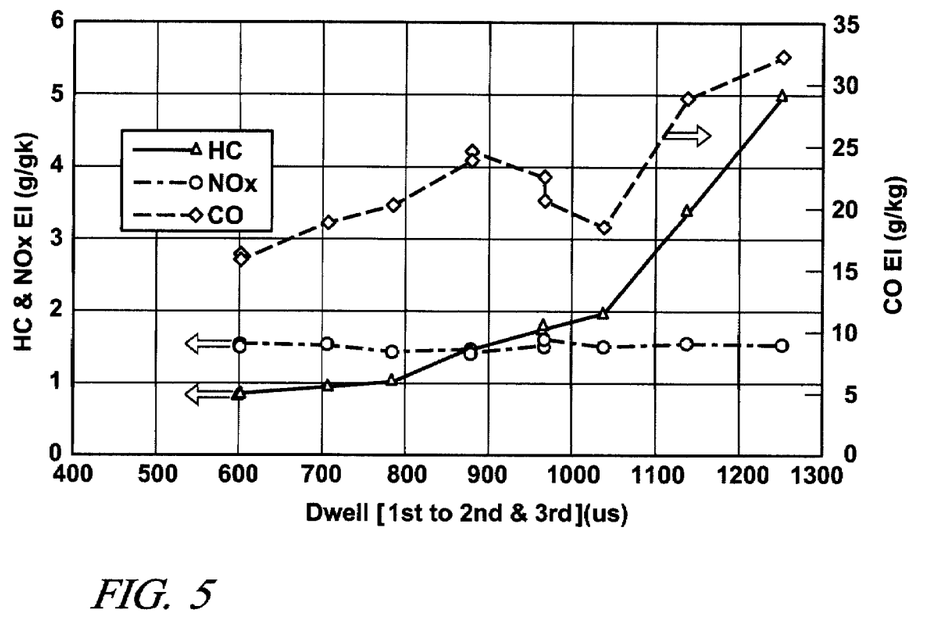

Referring now to FIG. 5, emissions results are graphically depicted over the range of dwell times for the testing described with reference to Table 1. Emissions results, comprising emissions indices (EI) for hydrocarbons (HC), carbon monoxide (CO), and nitrides of oxygen ($NO_x$) are depicted. The results indicate HC EI and CO EI tend to increase with increasing dwell. As previously mentioned, $NO_x$ EI was held constant at 1.5 g/kg and PM was held constant at 0.3 g/kg. At a dwell time of about 1000 microseconds, the effects upon HC and CO are acceptable, and the results indicate the exemplary engine to be readily compliant with current and upcoming regulations.

The results depicted in FIGS. 4 and 5 indicate that there is an optimum dwell time between the end of the first injection event and the beginning of the second injection event at which high engine efficiency balances with low PM emissions, and reasonable HC and CO emissions. Similarly, there is an optimum dwell time between the end of the second injection event and the beginning of the third injection event. Optimum dwell times between injections may be influenced by various factors. These factors include: fuel injection system characteristics which affect fuel flow, including, e.g., injector hole size, rail pressure variation, and injector targeting; combustion chamber bowl geometry and swirl level at various operating conditions; fuel burning rate as influenced by injection rate due to the injector nozzle flow number and rail pressure; fuel quantity per injection and total injected fuel quantity; opening and closing characteristics of the particular common rail fuel injector; fuel properties including, e.g., cetane number, distillation temperature range, viscosity, density; and, density of air and EGR mixture as affected by intake manifold pressure, compression ratio, and mixture temperature.

Figure 6:
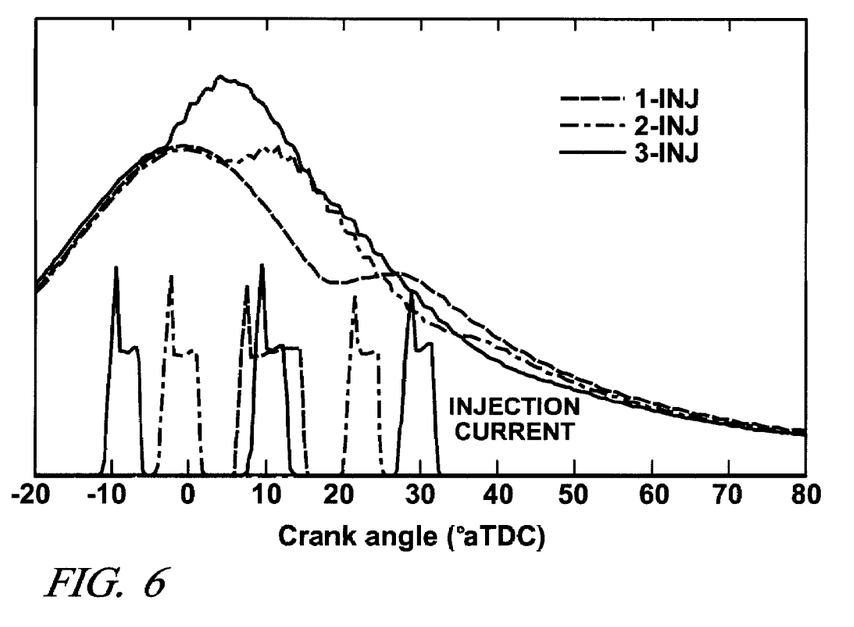
Figure 7:
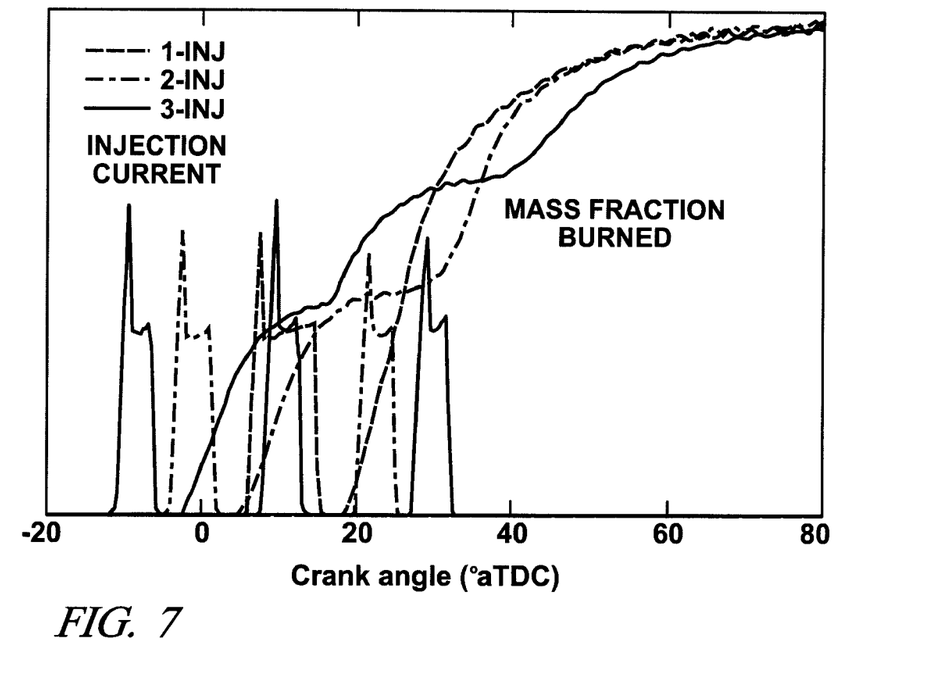

Referring now to FIGS. 6 and 7, exemplary data comprising cylinder pressures and mass fraction of fuel burned are graphically depicted over pertinent range of engine crank angle during the compression and expansion cycles. The exemplary data depicts results from engine testing at the engine operating condition described with reference to Table 1, with results for triple (3-INJ) injection events compared to results for single (1-INJ) and dual (2-INJ) injection events with the total quantity of fuel injected during each combustion cycle for the single, dual, and triple injection events. In FIG. 6, cylinder pressure traces are depicted for each of the single, dual, and triple injection strategies. In FIG. 7, cumulative mass-fraction of fuel burned is depicted for each of the single, dual, and triple injection strategies. For this comparison, dwell times were held constant at 1000 microseconds, $NO_x$ EI was held constant at 1.5-g/kg and PM EI was held constant at a value of 0.3 g/kg. As shown with reference to FIG. 6, the cumulative mass fraction burned traces illustrate distinct phases of combustion for each of the injection strategies. The optimal timing for dual injections results in the two pulses centered about the single injection pulse. Likewise, the optimal timing for triple injections also results in the three pulses centered about the single injection pulse. The cumulative mass fraction burned curves clearly demonstrate an effect of the three stages of combustion for the triple injection case, compared to the single and dual injection cases.

Figure 8:
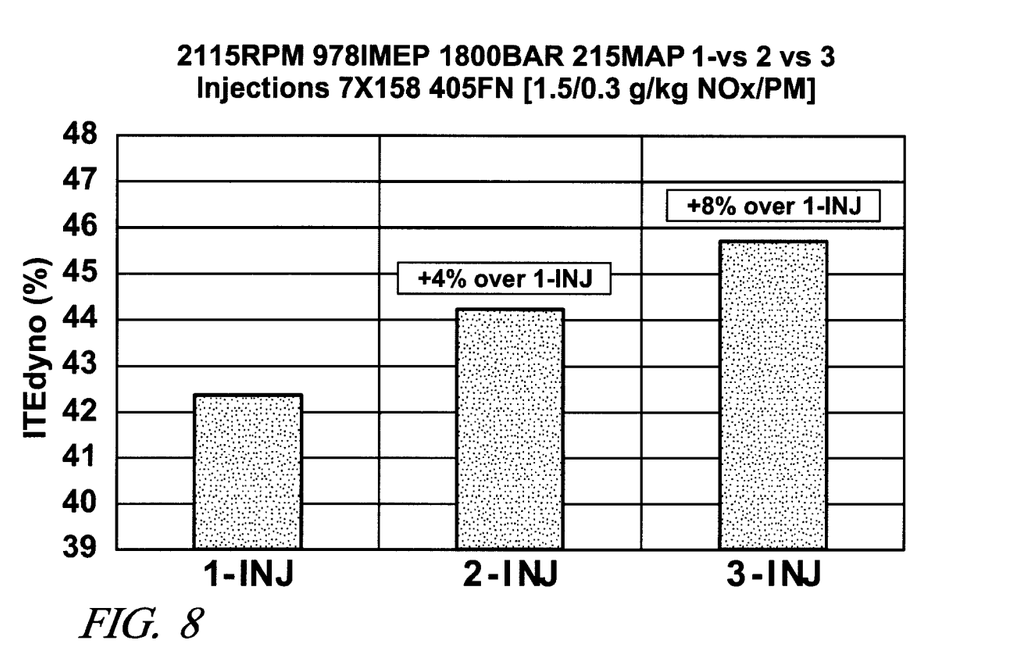
Figure 9:
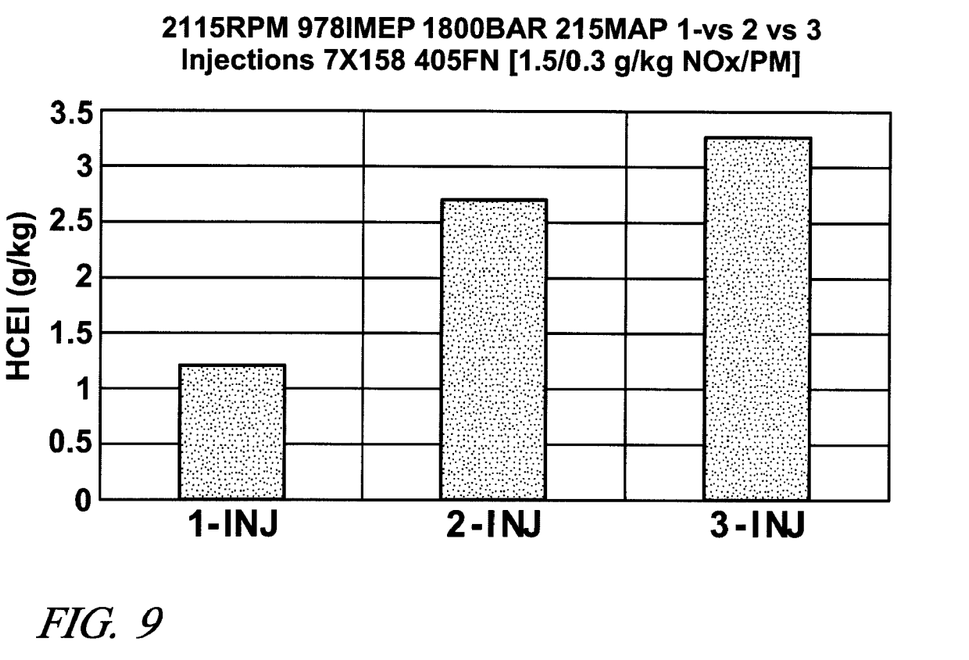
Figure 10:
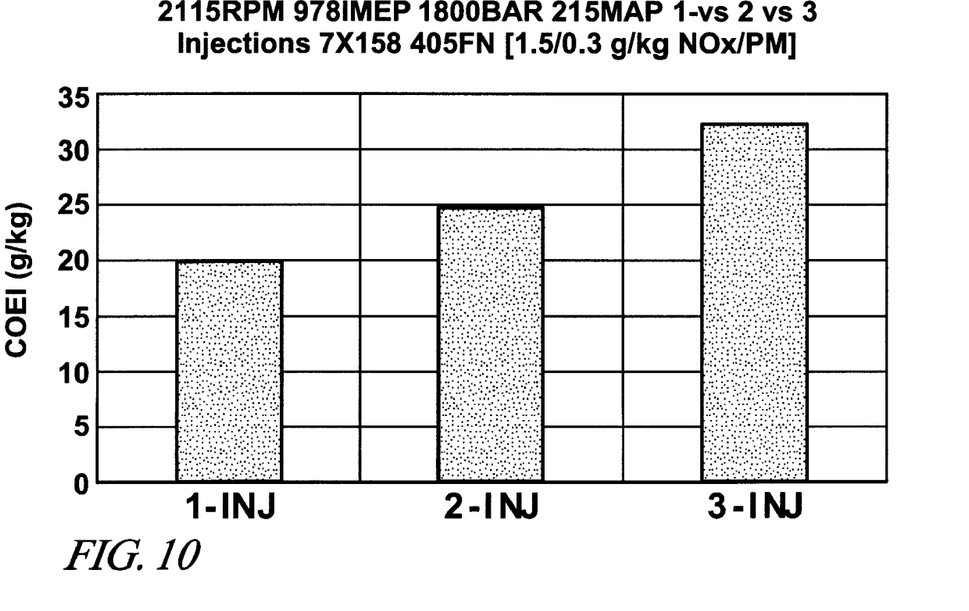
Figure 11:
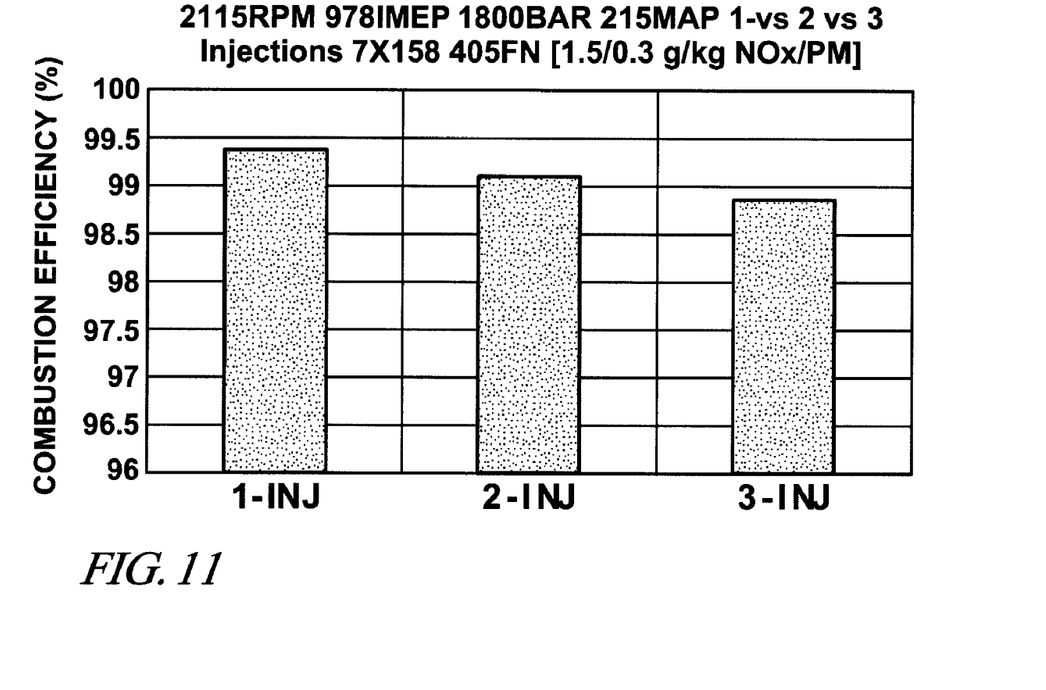
Figure 12:
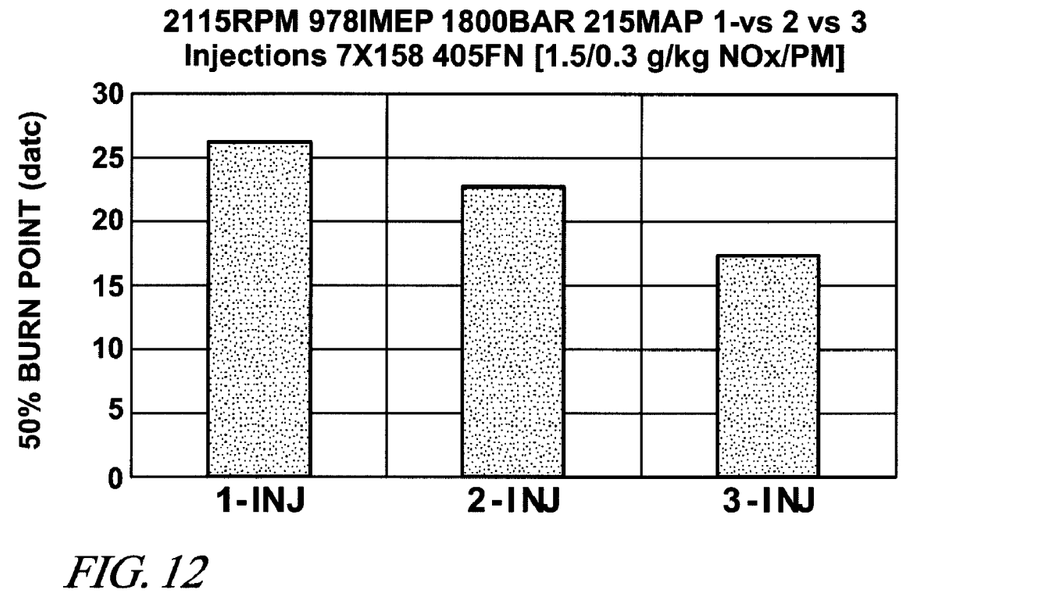
Figure 13:
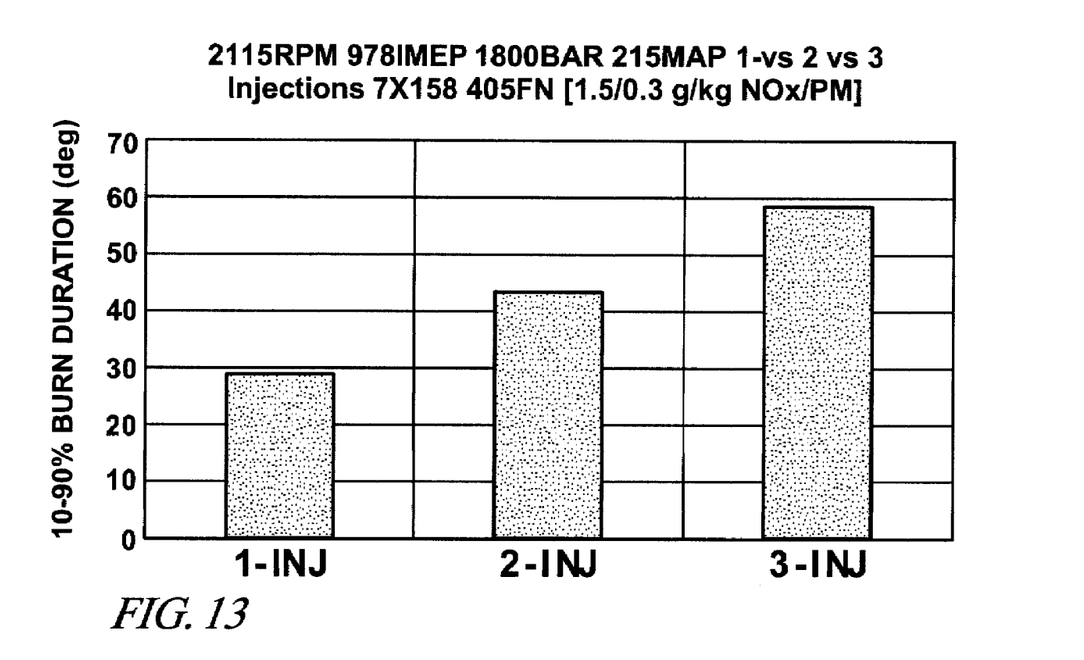
Figure 14:
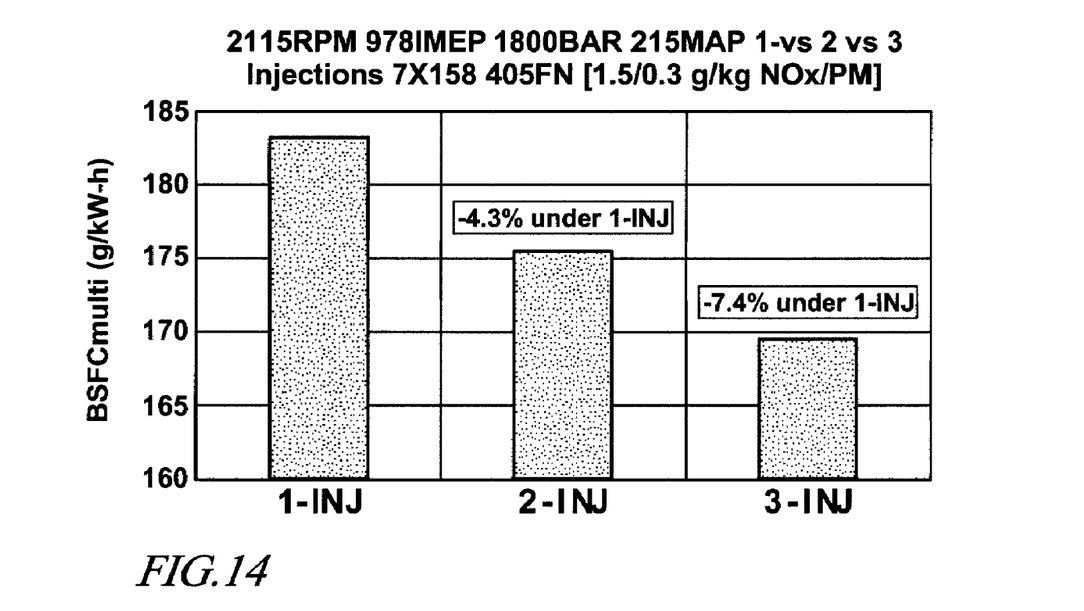

Referring now to FIGS. 8-14, the results demonstrated with reference to FIGS. 6 and 7 are further analyzed. Referring to FIG. 8, ITE for combustion with single, dual, and triple injection events indicate improvements in the indicated thermal efficiency using the triple injection event, as compared to the dual and single-injection combustion at equally low values of $NO_x$ and PM emissions. Dual injection events and corresponding dual-stage burning is shown to have a 4% efficiency advantage over single injection events and single-stage burning. Triple-injection events with triple-stage burning boosts efficiency advantage to about 8% over single-stage burning for the exemplary engine and operating conditions. Referring to FIGS. 9 and 10, HC EI and CO EI emissions increase with increasing stages of combustion, but the magnitudes are small. Furthermore, as shown in FIG. 11, there is a correspondingly minimal effect on combustion efficiency, showing a lowering of the combustion efficiency by a magnitude of about 0.5%. This effect on combustion efficiency is not reflected by engine thermal efficiency or by engine fuel consumption, as demonstrated with reference to FIGS. 11 and 14. Referring now to FIG. 12, gains in the indicated thermal efficiency from triple-injection as compared to dual-injection and single injection can be attributed to more advanced phasing of combustion, as demonstrated by location of the 50% burn-point, which advances toward top-dead-center with triple injection. For two injections, the phasing advances about one half ways between the single-injection and triple injection case. Furthermore, as shown with reference to FIG. 13, the added dwell between injections results in two-stage burning taking longer than single-stage burning, and triple-stage burning taking even longer, as indicated by 10-90% burn duration (measured in °CA) increases significantly with the increased stages of burning. Such longer burning durations ultimately limits efficiency gains resulting from improved combustion phasing. This also explains why further improvements in thermal efficiency are unlikely with more than three injection events. Referring to FIG. 14, brake-specific fuel consumption (BFSC) for the exemplary engine is depicted for operation using single, dual, and triple injection. The engine operating using the triple injection as described herein demonstrates a 7.4% reduction in BFSC, as compared to using the single injection for the same engine operating point.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for controlling fuel injection into an internal combustion engine, comprising:

executing three fuel injection events having dwell times therebetween to inject a quantity of fuel into a combustion chamber during a combustion cycle;

setting the first dwell time substantially equal to the second dwell time; and, determining a crank angle for initiating the first fuel injection event based upon a crank angle at which fifty percent of the quantity of fuel injected during the combustion cycle for the three injection event is substantially the same as for a single injection event for injecting the quantity of fuel.

2. The method of claim 1, further comprising selectively executing the three fuel injection events only when it is determined the engine is operating in a high load operating range.

3. The method of claim 2, wherein determining the engine is operating in a high load operating range comprises determining the engine is operating at a brake-mean effective pressure greater than about eight bar.

4. Method for controlling fuel injection into an internal combustion engine, comprising:

executing three fuel injection events having dwell times therebetween to inject a quantity of fuel into a combustion chamber during a combustion cycle;

injecting substantially equal quantities of fuel during each of the three fuel injection events; and, determining a crank angle for initiating the first fuel injection event based upon a crank angle at which fifty percent of the quantity of fuel injected during the combustion cycle for the three injection event is substantially the same as for a single injection event for injecting the quantity of fuel.

5. The method of claim 4, further comprising initiating the first fuel injection event during a compression stroke immediately before a top-dead-center point of piston travel.

6. The method of claim 4, further comprising selectively executing the three fuel injection events only when it is determined the engine is operating in a high load operating range.

7. Method for controlling fuel injection into an internal combustion engine operating at high-load conditions, comprising:

executing three fuel injection events having dwell times therebetween to inject a quantity of fuel into a combustion chamber during a combustion cycle;

setting the first dwell time substantially equal to the second dwell time;

injecting substantially equal quantities of fuel during each of the three fuel injection events; and, determining a crank angle for initiating the first fuel injection event based upon a crank angle at which fifty percent of the quantity of fuel injected during the combustion cycle for the three injection event is substantially the same as for a single injection event for injecting the quantity of fuel.

8. The method of claim 7, comprising initiating the first fuel injection event during a compression stroke immediately before a top-dead-center point of piston travel.

9. Internal combustion engine, comprising:

a diffusion-combustion engine equipped with a fuel-injection system comprising a high-pressure fuel system and a plurality of fuel injectors each adapted to inject fuel directly into a combustion chamber of the engine; and, a controller, adapted to:

monitor engine operation and determine an engine operating point;

determine a quantity of fuel to inject into one of the combustion chambers during a combustion cycle; and, selectively actuate one of the fuel injectors to execute three fuel injection events to deliver the determined quantity of fuel to the combustion chamber during the combustion cycle, comprising:

i) executing the three fuel injection events with dwell times therebetween;

ii) setting the first dwell time substantially equal to the second dwell time;

iii) injecting substantially equal quantities of fuel during each of the three fuel injection events; and, iv) determining a crank angle for initiating the first fuel injection event based upon a crank angle at which fifty percent of the quantity of fuel injected during the combustion cycle for the three injection event is substantially the same as for a single injection event for injecting the quantity of fuel.

10. The internal combustion engine of claim 9, wherein the diffusion combustion engine comprises a direct injection compression-ignition engine.

11. The internal combustion engine of claim 9, wherein the high-pressure fuel system is effective to operate at a fuel pressure ranging to 1800 bar.

12. The internal combustion engine of claim 9, wherein the controller is adapted to selectively actuate one of the fuel injectors to execute three fuel injection events to deliver the determined quantity of fuel when the engine operating point exceeds a predetermined threshold.

13. The internal combustion engine of claim 12, further comprising: each fuel injector characterized by a minimum flowrate; and, the predetermined threshold for engine operating point based upon engine operation comprising three fuel injection events at the minimum flowrate during the combustion cycle.

* * * * *